(No Model.)

D. B. BERNARD & E. H. RICE.
BARBED FENCE.

No. 243,835.    Patented July 5, 1881.

Witnesses—
T. Everett Brown
H. W. Munday

Inventor—
David B. Bernard
Elisha H. Rice
by Munday, Evarts &
Adcock, attys

UNITED STATES PATENT OFFICE.

DAVID B. BERNARD AND ELISHA H. RICE, OF KIRKSVILLE, MISSOURI.

BARBED FENCE.

SPECIFICATION forming part of Letters Patent No. 243,835, dated July 5, 1881.

Application filed April 26, 1881. (No model.)

*To all whom it may concern:*

Be it known that we, DAVID B. BERNARD and ELISHA H. RICE, of Kirksville, in the county of Adair and State of Missouri, have invented certain new and useful Improvements in Barbed Fences, of which the following is a specification.

This invention relates to that class of barbed fences which are composed of longitudinal wires and vertical pickets secured thereto; and the invention consists in securing the pickets to the wires by staples, one point of which is clinched upon the picket and the other is left to project, whereby the fastening device is made to serve a double purpose.

For a more full understanding of our invention we refer to the accompanying drawings, which form a part of this specification, and wherein—

Figure 1:
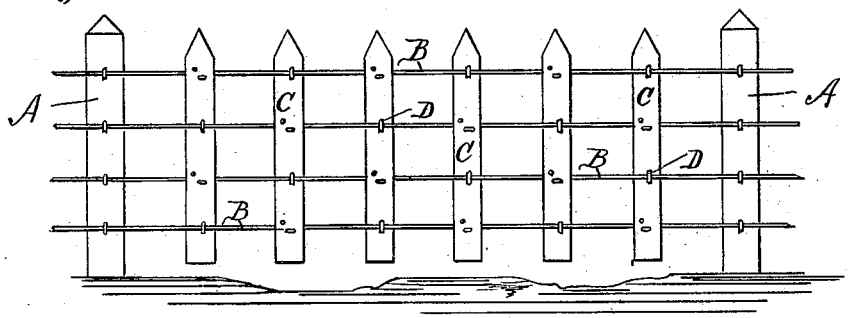
Figure 2:
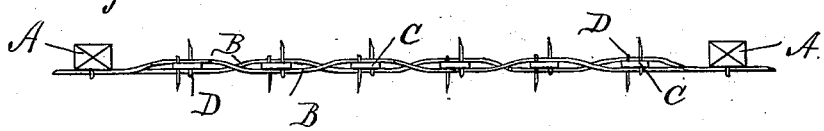
Figure 3:
Figure 4:
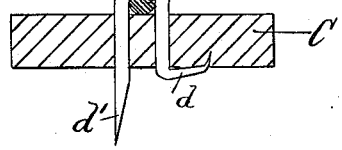

Figure 1 is an elevation of our improved fence. Fig. 2 is a top view of the same. Fig. 3 shows the fastening-staple, and Fig. 4 is a section of one of the pickets taken in the plane occupied by one of the fastenings.

Like letters indicate like parts wherever the same are used.

In said drawings, A represents the posts; B, the fence-wires; C, the pickets. The latter are interwoven in the wires as shown—that is to say, the alternate wires pass upon opposite sides of the pickets. The wires and pickets are further secured together at each junction thereof by staples D, which are placed astride the wires and then driven into the pickets, so that their points penetrate entirely through the latter and project upon the opposite side thereof.

In order to prevent withdrawal or slipping out of the staples one point, *d*, thereof is bent back against the picket, and the other, *d'*, left standing out straight, whereby the latter is caused to act as a thorn in protecting the fence. The staples being driven from opposite sides at the adjacent junctions of the wires with the pickets, the latter are protected upon both sides, as will be seen from the drawings.

When the pickets are so thoroughly protected upon both sides with barbed points, as they are in our fence, they do not need to be very strong, and we find that they may be made about the size of ordinary lath and answer the purpose very well.

Our fence is not only very effective, but very economical to make.

As shown by the drawings, we use the ordinary merchant staple, because it is cheap and ready for insertion when purchased at the hardware-store.

We claim—

The combination, with the wires and interwoven wood pickets, of the staples D, placed astride the wires and passed entirely through the pickets, whereby they are made to serve the double purpose of securing the wires and pickets together and of barbing the fence, substantially as set forth.

DAVID B. BERNARD.
ELISHA H. RICE.

Witnesses:
J. A. BEST,
ARTHUR WILLIAMS.